(12) United States Patent
Wilson

(10) Patent No.: US 9,650,085 B2
(45) Date of Patent: May 16, 2017

(54) MODULAR TRUCK BED STORAGE SYSTEM

(71) Applicant: Jeff A. Wilson, Lakewood, CO (US)

(72) Inventor: Jeff A. Wilson, Lakewood, CO (US)

(*) Notice: Subject to any disclaimer, the term of this patent is extended or adjusted under 35 U.S.C. 154(b) by 0 days.

(21) Appl. No.: 15/009,686

(22) Filed: Jan. 28, 2016

(65) Prior Publication Data

US 2016/0167718 A1  Jun. 16, 2016

Related U.S. Application Data

(63) Continuation-in-part of application No. 14/340,220, filed on Jul. 24, 2014, now abandoned.

(60) Provisional application No. 61/865,742, filed on Aug. 14, 2013.

(51) Int. Cl.
*B60R 9/06* (2006.01)
*B62D 33/02* (2006.01)
*B60R 5/04* (2006.01)

(52) U.S. Cl.
CPC .......... *B62D 33/0207* (2013.01); *B60R 5/045* (2013.01); *B60R 9/065* (2013.01)

(58) Field of Classification Search
CPC ..... B62D 33/0207; B60R 5/045; B60R 9/065; B60R 9/00; B60R 11/06; B60R 5/046; B60R 5/047
See application file for complete search history.

(56) References Cited

U.S. PATENT DOCUMENTS

| | | |
|---|---|---|
| 3,353,704 A | 11/1967 | Belcher |
| 4,091,950 A | 5/1978 | Craven |
| 4,635,992 A | 1/1987 | Hamilton |
| 4,850,519 A | 7/1989 | Farmer, Jr. |
| 5,169,200 A | 12/1992 | Pugh |
| 5,186,510 A | 2/1993 | Stapp |
| 5,201,561 A | 4/1993 | Brown |
| 5,398,868 A | 3/1995 | Densen |
| 5,464,264 A | 11/1995 | Wilson |
| 5,598,961 A | 2/1997 | Sills |
| 6,135,527 A | 10/2000 | Bily |
| 6,257,640 B1 | 7/2001 | Leitner |
| 6,536,826 B1 | 3/2003 | Reed |
| 7,028,859 B2 | 4/2006 | Moon et al. |
| 8,317,442 B2 | 11/2012 | Daikuzono |
| 2006/0266778 A1 | 11/2006 | Allotey |
| 2012/0085800 A1 | 4/2012 | Maimin |

FOREIGN PATENT DOCUMENTS

WO    89/12546 A1    12/1989

*Primary Examiner* — Corey Skurdal
(74) *Attorney, Agent, or Firm* — Trenner Law Firm, LLC; Mark D. Trenner

(57) ABSTRACT

A modular truck bed storage system is disclosed which may be readily assembled and unassembled in a bed of a truck. An example of the truck bed storage system includes a removable end panel. A header assembly is configured to insert between a truck cab and a truck bed. The example truck bed storage system further includes a lid assembly having a top portion connected to a frame to operate between an open position and a closed position. A plurality of latches secure the header assembly and the lid assembly under an inner edge of the truck bed.

15 Claims, 22 Drawing Sheets

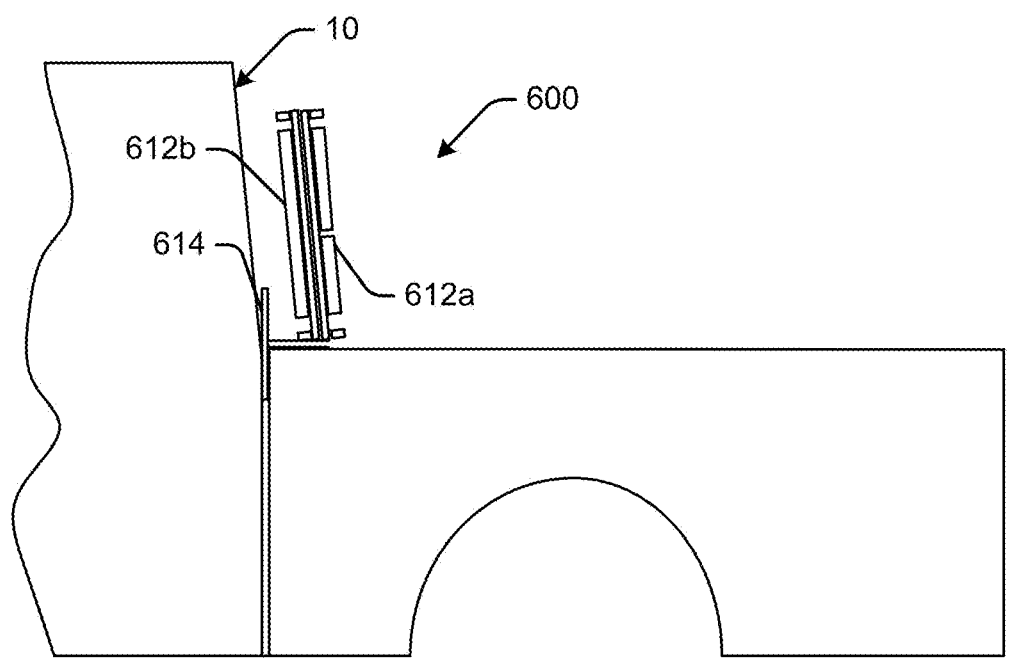

MODULAR TRUCK BED STORAGE SYSTEM

PRIORITY CLAIM

This application is a continuation-in-part (CIP) application of U.S. patent application Ser. No. 14/340,220 filed Jul. 24, 2014 for "Modular Truck Bed Storage System" of Jeff A. Wilson, which claims the priority benefit of U.S. Provisional Patent Application No. 61/865,742 filed Aug. 14, 2013 for "Truck Storage" of Jeff A. Wilson, each hereby incorporated by reference in its entirety as though fully set forth herein.

BACKGROUND

Pickup trucks continue to be a popular choice of consumers for a variety of uses (e.g., personal/recreational and commercial transportation). One reason for their popularity is the truck bed which enables transport of cargo and other articles outside of the passenger cabin. Unfortunately, anything stowed in the truck bed generally remains visible and is susceptible to weather and theft.

BRIEF DESCRIPTION OF THE DRAWINGS

FIGS. 23A-C illustrate operation of the example truck bed storage system shown in FIGS. 16-21.

DETAILED DESCRIPTION

Figure 1:
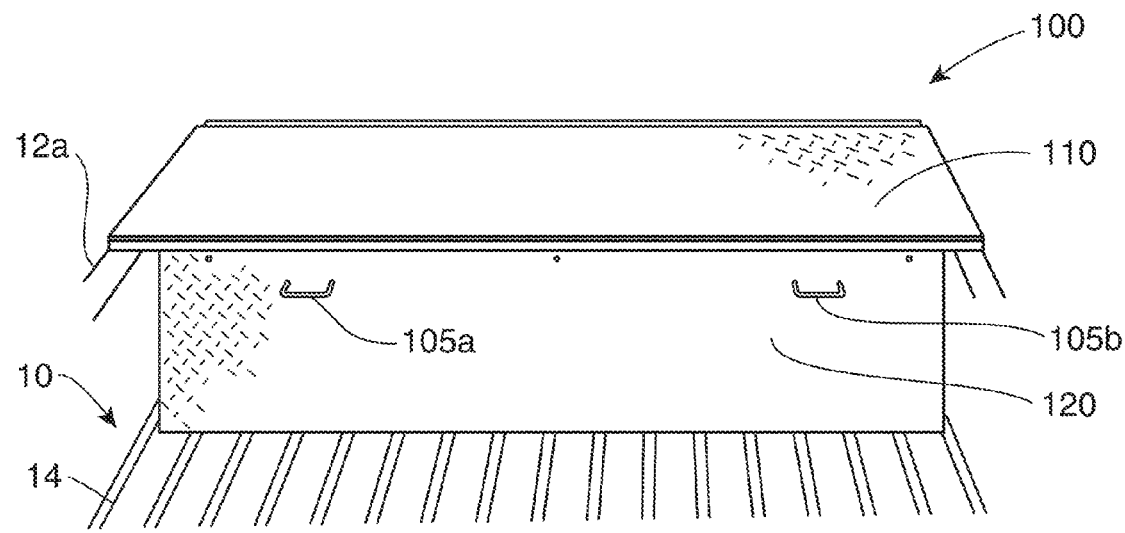
FIG. 1 is a perspective view of an example assembled truck bed storage system, as the lid assembly may be in a closed position.

About 10 years ago, the standard pickup bed length was 8 feet long. Today it is between about 6 and 6.5 feet long. The "standard" tool box width is about 2 feet. Therefore, the standard tool box uses approximately 30% of the total bed length. With the 6 foot bed, a 30% loss of the bed length becomes a problem. A "standard" cargo box uses approximately 60% of the bed length, creating an even bigger problem. Pickup trucks are designed for open bed hauling, and tool boxes and cargo boxes tend to restrict that use. For example, truck owners often have to remove their tool box 3 or 4 times every month to accommodate open bed hauling.

The modular truck bed storage system disclosed herein enables a cargo box and/or tool box configuration with a quick conversion to open bed hauling. In addition, the conversion can be made even when away from home, because the box remains fastened to the truck and allows for 100% open bed hauling.

A modular truck bed storage system is disclosed which may be readily assembled and unassembled in a bed of a truck. An example of the truck bed storage system includes a removable end panel, and a lid assembly forming a compartment in the truck bed. The lid assembly has a top portion connected to a frame to operate between an open position and a closed position. The frame is configured for securement to at least one sidewall of a truck bed. Another example includes side panels and a floor plate. Another example includes multiple end panels and a sectioned lid, enabling sub-compartments within the compartment.

In an example, surfaces of the truck bed itself (e.g., sidewalls and floor) are used to form part of the storage compartment. In one example, only two sides of the truckbed storage system are added to the truck bed to yield a six-sided storage compartment. In a second example, a floor plate may be added. In a third example, a foldable lid and multi-section storage compartment is provided.

In an example, a modular design enables a user to readily position separate components of the truck bed storage system into a truck bed. As such, the user does not have to ask for assistance and/or struggle by him or herself to position a heavy, cumbersome toolbox into the truck-bed. In addition, the truck bed storage system can be readily uninstalled from the truck bed, and easily stored (e.g., in a small storage closet). In examples, less material is needed to manufacture the truck bed storage system (e.g., than typical of pickup truck tool boxes).

Before continuing, it is noted that as used herein, the terms "includes" and "including" mean, but is not limited to, "includes" or "including" and "includes at least" or "including at least." The term "based on" means "based on" and "based at least in part on."

It should be further noted that the scope of the disclosure should not be limited to dimensions which may be represented in the figures. Various sizes and dimensions of the invention may be used to accommodate a variety of vehicles (e.g., large and smaller truck beds). In addition, components shown and described in the example(s) may be interchanged and/or added to and/or removed from components of another of the example(s).

Figure 2:
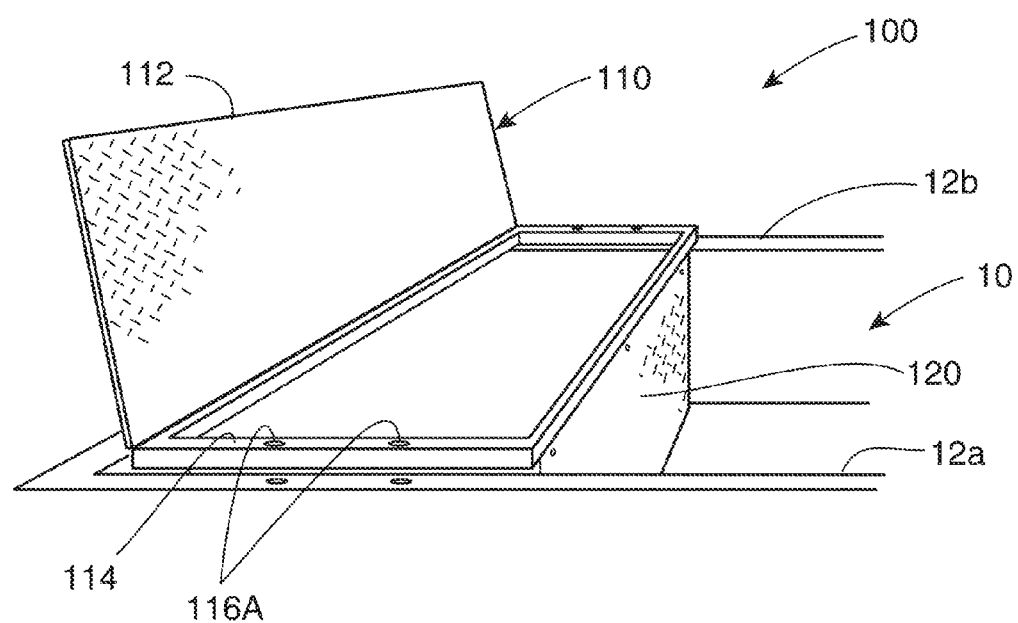
FIG. 2 illustrates the example assembled truck bed storage system shown in FIG. 1, as the lid assembly may be in an open position.

FIG. 1 is a perspective view of an example assembled truck bed storage system 100, as a lid assembly 110 may be in a closed position. FIG. 2 illustrates the example assembled truck bed storage system 100 shown in FIG. 1, as the lid assembly 110 may be in an open position. The example truck bed storage system 100 is shown in FIGS. 1 and 2 as it may be mounted in a truck bed 10 having sidewalls 12a-b and floor 14.

Figure 3:
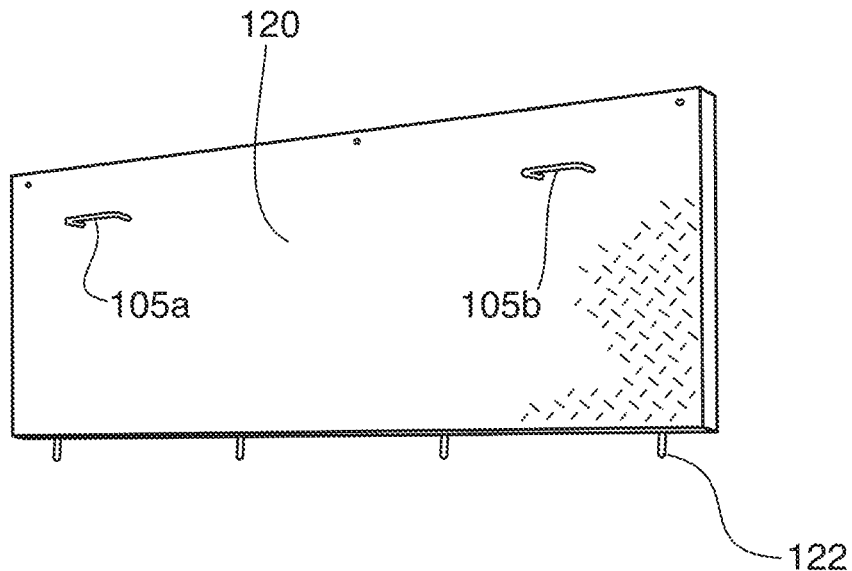
FIG. 3 shows an example end panel of the example truck bed storage system.

The lid assembly 110 may include top portion 112 and a frame 114. The top portion 112 may be hinged to the frame 114. The example truck bed storage system 100 also includes an end plate 120. FIG. 3 shows an example end panel 120 of the example truck bed storage system. The end panel 120 may be provided in the truck bed 10, e.g., by way of pins 122 attached to a bottom edge of the end plate 120.

The truck bed storage system 100 may be manufactured of any suitable material, such as but not limited to, metal, plastic, metal or plastic—coated wood, and/or other materials.

Figure 4:
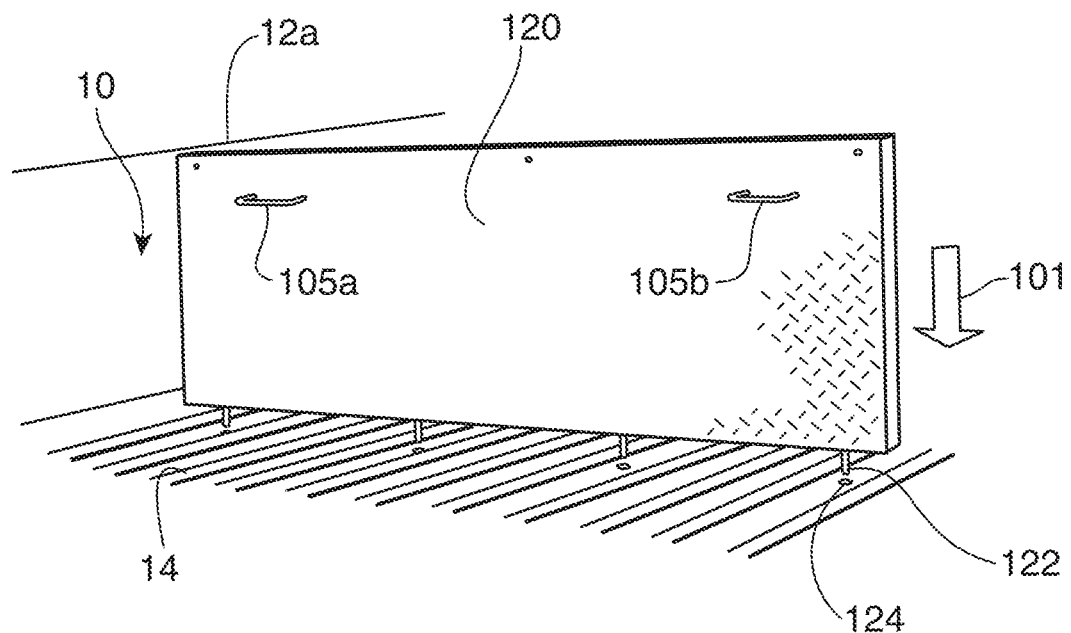
FIG. 4 illustrates installation of the example end panel shown in FIG. 3.

FIG. 4 illustrates installation of the example end panel shown in FIG. 3. The end plate can then be placed into the truck bed 10, e.g., as illustrated by arrow 101. If the truck bed does not already have corresponding openings 124 for the pins 122 (e.g., this is a first time installation in the truck bed 10), then positions of the pins 122 may be marked on the floor 14 of the truck bed 10, and holes drilled at those positions.

With reference again to FIG. 2, the frame 114 may then be secured to the side walls 12a-b of the truck bed 10. For example, the frame 114 may be secured by bolts or other fasteners through holes 116 formed in the frame 114 and aligned with corresponding openings formed in the sidewalls 12a-b of the truck bed 10.

If not already provided, the openings in the sidewalls 12a-b of the truck bed 10 may be formed with an appropriate drill bit by first aligning the frame 114 on top of the sidewalls 12a-b, marking the desired location, and drilling holes. Although not shown, the frame 114 may also be secured to end panel 120.

To disassemble the storage system, the process for assembly can be reversed. Disassembly may easily be performed by a single person. While unassembled, the system components are capable of lying on top of one another to occupy a space small relative to the space defined by the assembled system. This feature facilitates storage and transport of the system.

In an example, handles 105a-b may be provided on the end plate 120 (as shown in FIGS. 1 and 3-4) and/or on the lid assembly 110 (not shown). Handles 105a-b may facilitate the user lifting the end plate 120 into and out of the truck bed 10. Other accessories may also be provided (e.g., locks, hooks, mounts for a sports rack, etc.).

Before continuing, it should be noted that the examples described above are provided for purposes of illustration, and are not intended to be limiting. Other devices and/or device configurations may be utilized to carry out the operations described herein.

Figure 5:
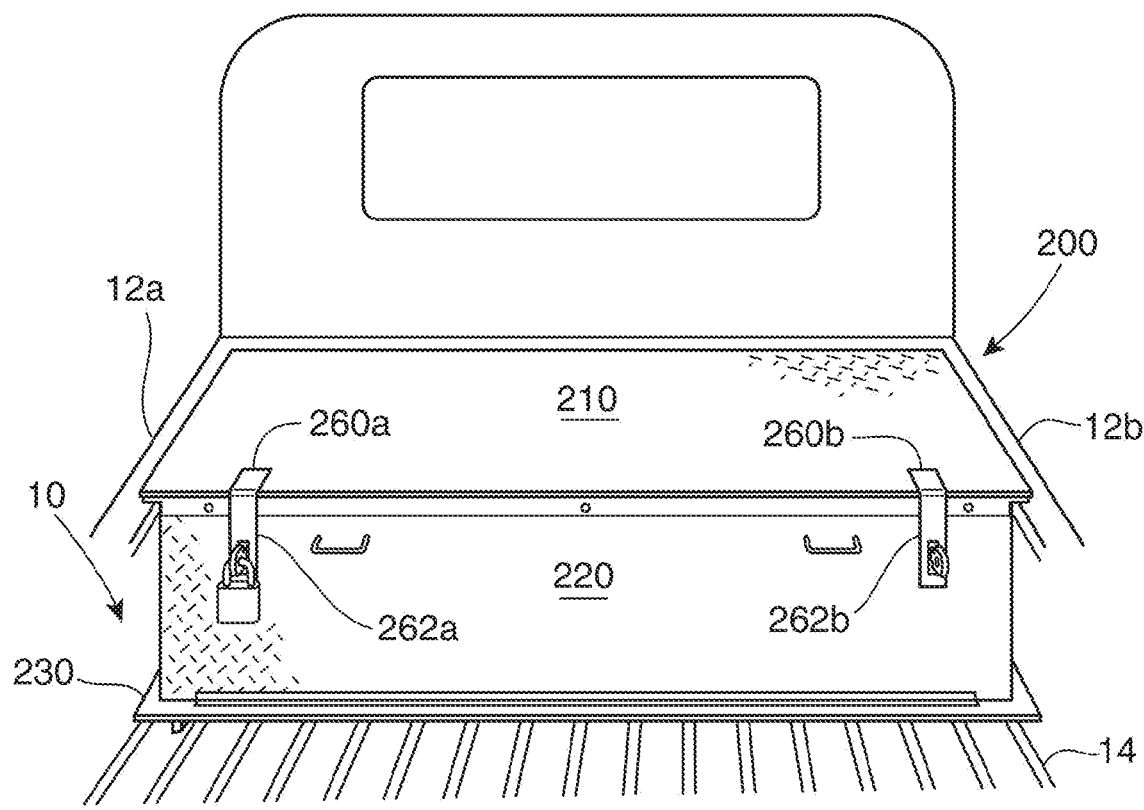
FIG. 5 is a perspective view of another example assembled truck bed storage system, as the lid assembly may be in a closed position.
Figure 6:
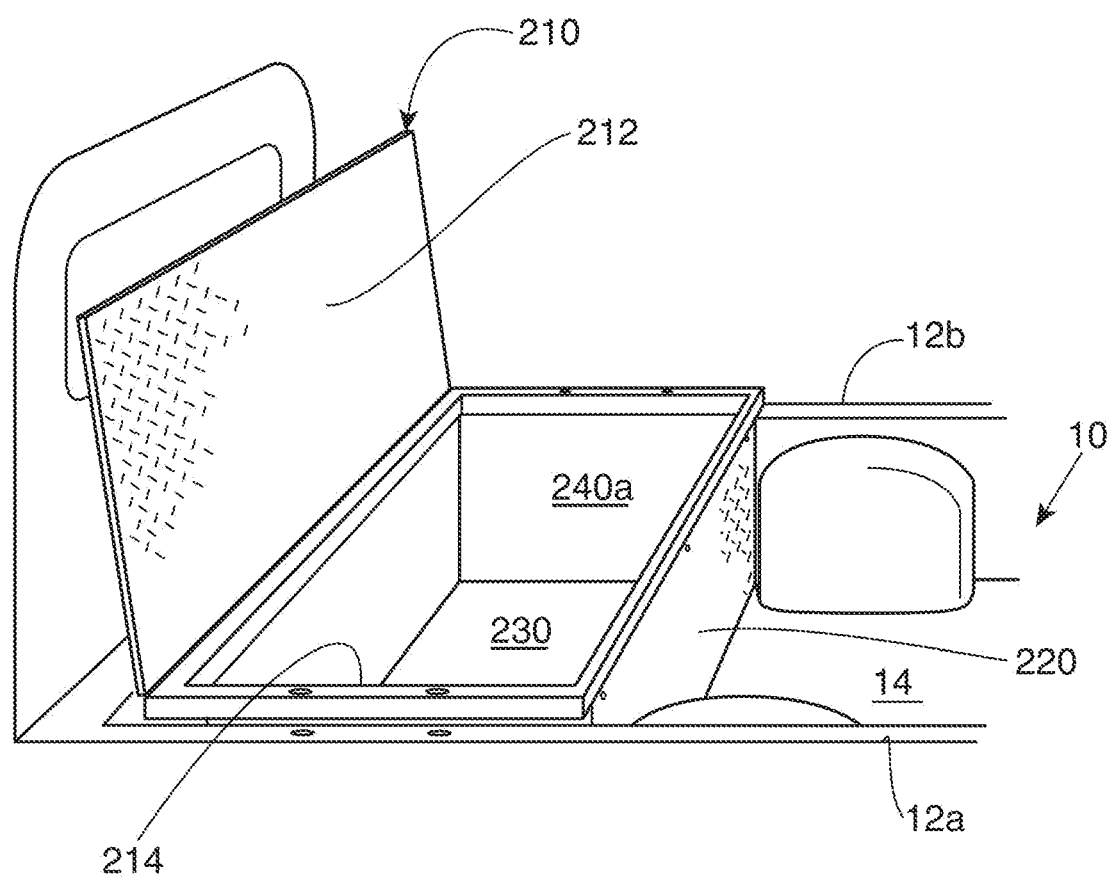
FIG. 6 illustrates the example assembled truck bed storage system shown in FIG. 5, as the lid assembly may be in an open position.

FIG. 5 is a perspective view of another example assembled truck bed storage system 200, as the lid assembly 210 may be in a closed position. FIG. 6 illustrates the example assembled truck bed storage system 200 shown in FIG. 5, as the lid assembly 210 may be in an open position. The example truck bed storage system 200 is shown in FIGS. 5 and 6 as it may be mounted in a truck bed 10 having sidewalls 12a-b and floor 14.

The lid assembly 210 may include top portion 212 and a frame 214. The top portion 212 may be hinged to the frame 214. The example truck bed storage system 200 also includes an end panel 220, a floor plate 230 and side panels 240a-b (one for each side as shown in FIG. 8, although only one side plate 240a is visible in FIG. 6).

Figure 7:
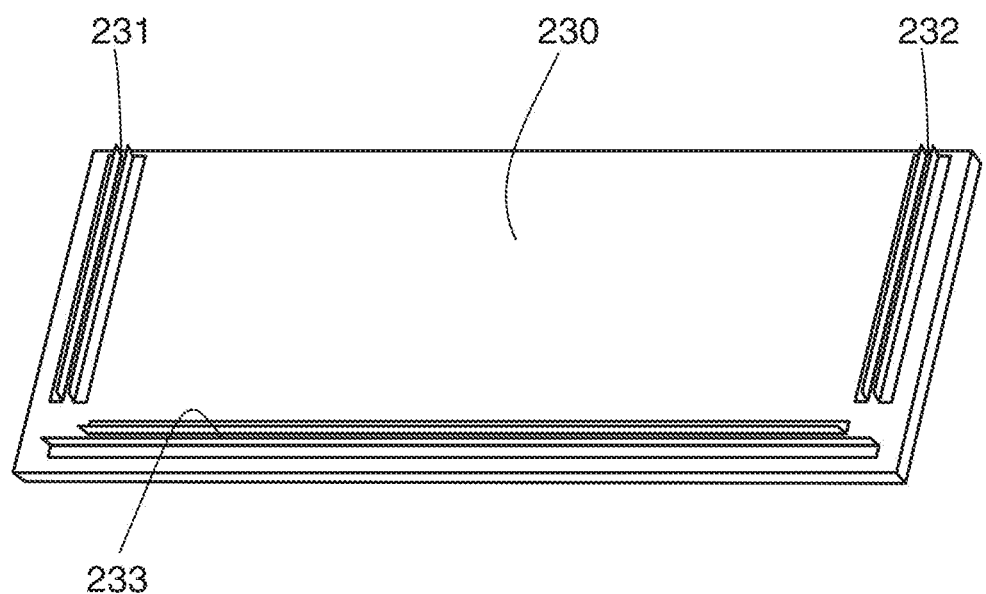
FIG. 7 illustrates a floor plate of the truck bed storage system shown in FIG. 5.

FIG. 7 illustrates a floor plate 230 of the truck bed storage system 200 shown in FIG. 5. In this example, the floor plate 230 includes rails 231 and 232 for receiving a lower edge of the side panels 240a-b, and a rail 233 for receiving the end panel 220. In an example, the floor plate 230 may be secured to the floor 14 of the truck bed 10, e.g., by pins, bolts, or other fasteners so that the floor plate 230 remains in a substantially fixed position in the truck bed 10. In another example, the floor plate 230 need not be secured to the floor 14 of the truck bed 10, as securing the frame 214 to the side walls of the truck bed will aid in securing the truck bed storage system 200.

Figure 8:
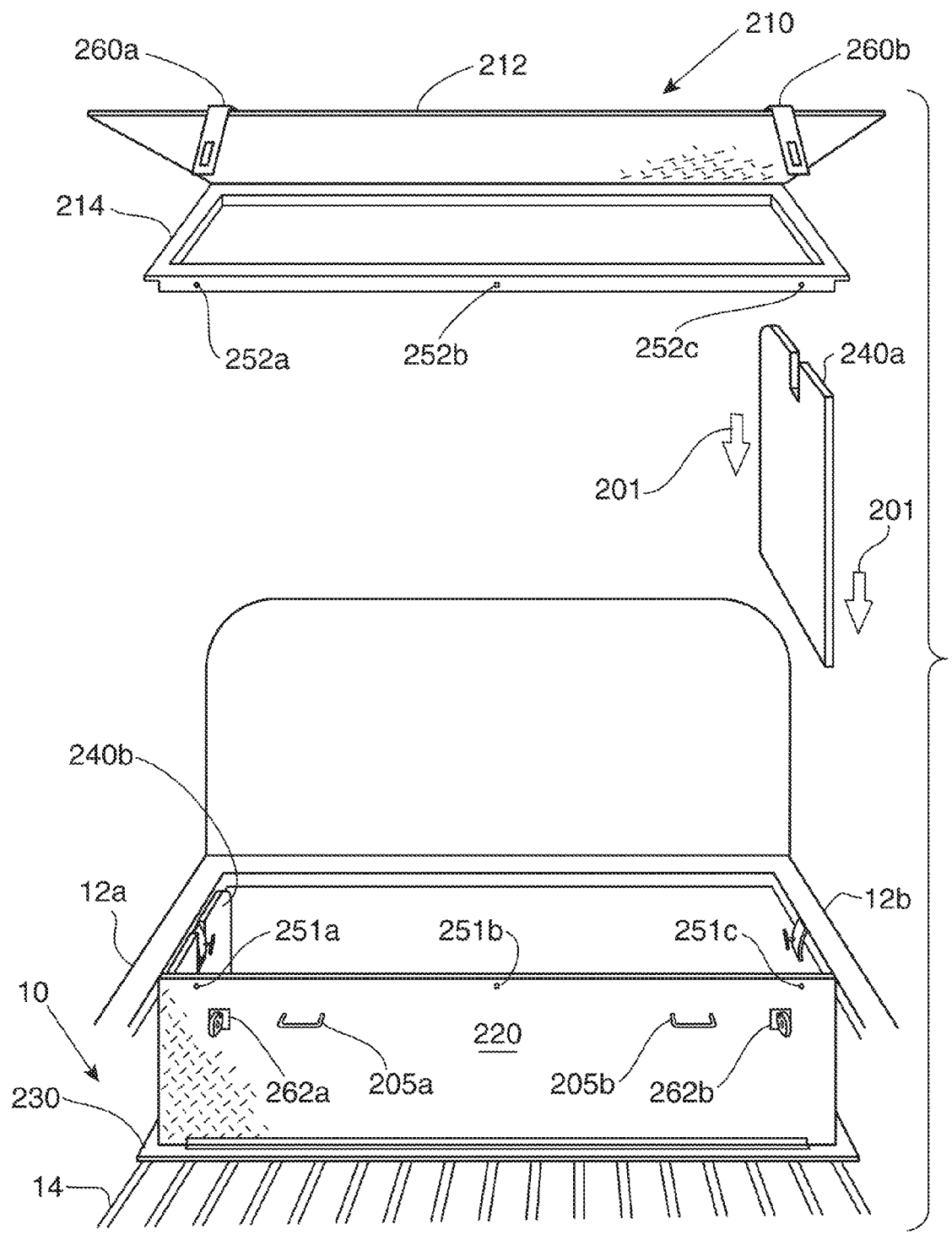
FIG. 8 illustrates installation of the example the truck bed storage system shown in FIG. 5.

FIG. 8 illustrates installation of the example the truck bed storage system 200 shown in FIG. 5, in the truck bed 10. In an example, the floor plate 230 is positioned on the truck bed floor 14. Then the end panel 220 and side panels 240a-b are slid into the rails 231-233 (see FIG. 7), e.g., in the direction illustrated by arrows 201 in FIG. 8.

The frame 214 may then be secured to the side walls 12a-b of the truck bed 10. For example, the frame 214 may be secured by bolts or other fasteners through holes formed in the frame 214 and aligned with corresponding openings formed in the sidewalls 12a-b of the truck bed 10, as already described above with reference to FIG. 2. The frame 114 may also be secured to end panel 220, for example, by inserting a bolt or other fastener (only fasteners 250a-b are shown in FIG. 9) through openings 251a-c and 252a-c, as seen in FIGS. 8 and 9.

To disassemble the storage system, the process for assembly can be reversed. Disassembly may easily be performed by a single person. While unassembled, the system components are capable of lying on top of one another to occupy a space small relative to the space defined by the assembled system. This feature facilitates storage and transport of the system.

Figure 9:
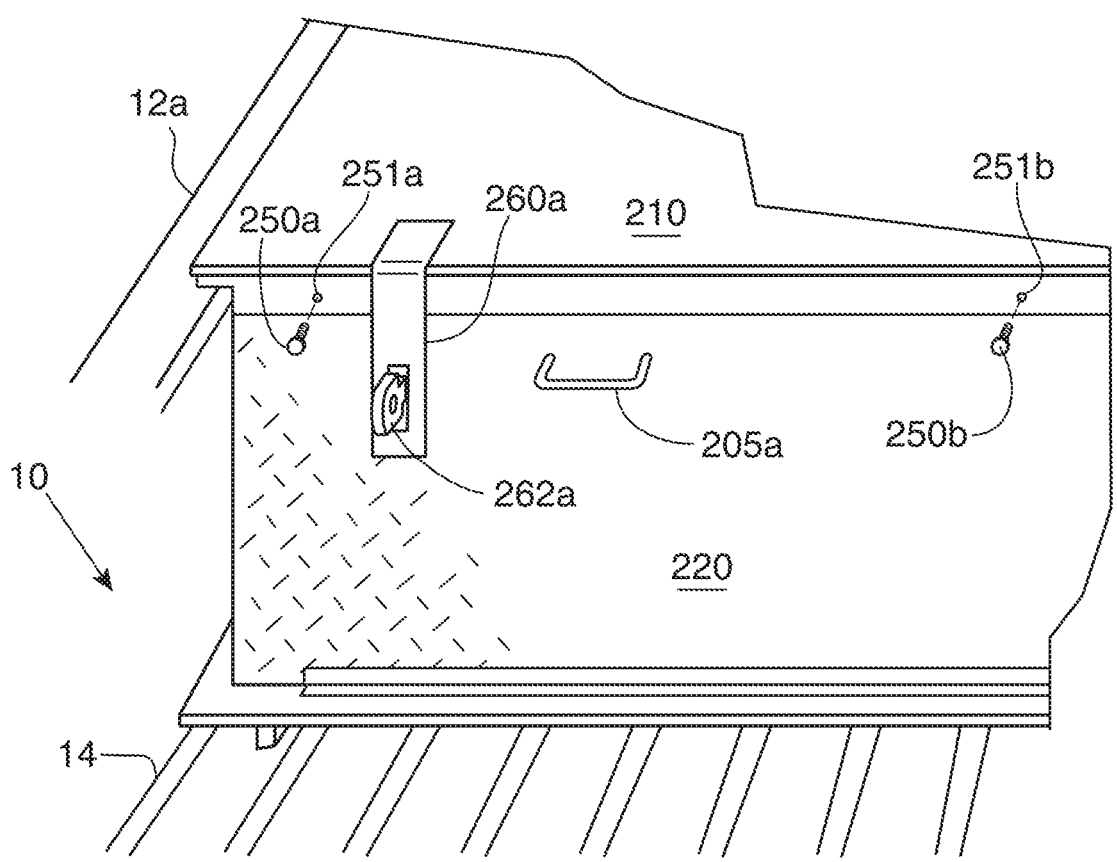
FIG. 9 illustrates installation of a lid of the example the truck bed storage system shown in FIG. 5.

In an example, handles 205a-b may be provided on the end panel 220 (as shown in FIGS. 8 and 9) and/or on the lid assembly 210 (not shown). Handles 205a-b may facilitate the user lifting the end panel 220 into and out of the truck bed 10. Other accessories may also be provided (e.g., locks, hooks, mounts for a sports rack, etc.). For example, latching mechanism including latch 260a-b and turnkey 262a-b and a lock 265 are illustrated in FIGS. 5, 8 and 9.

Figure 10:
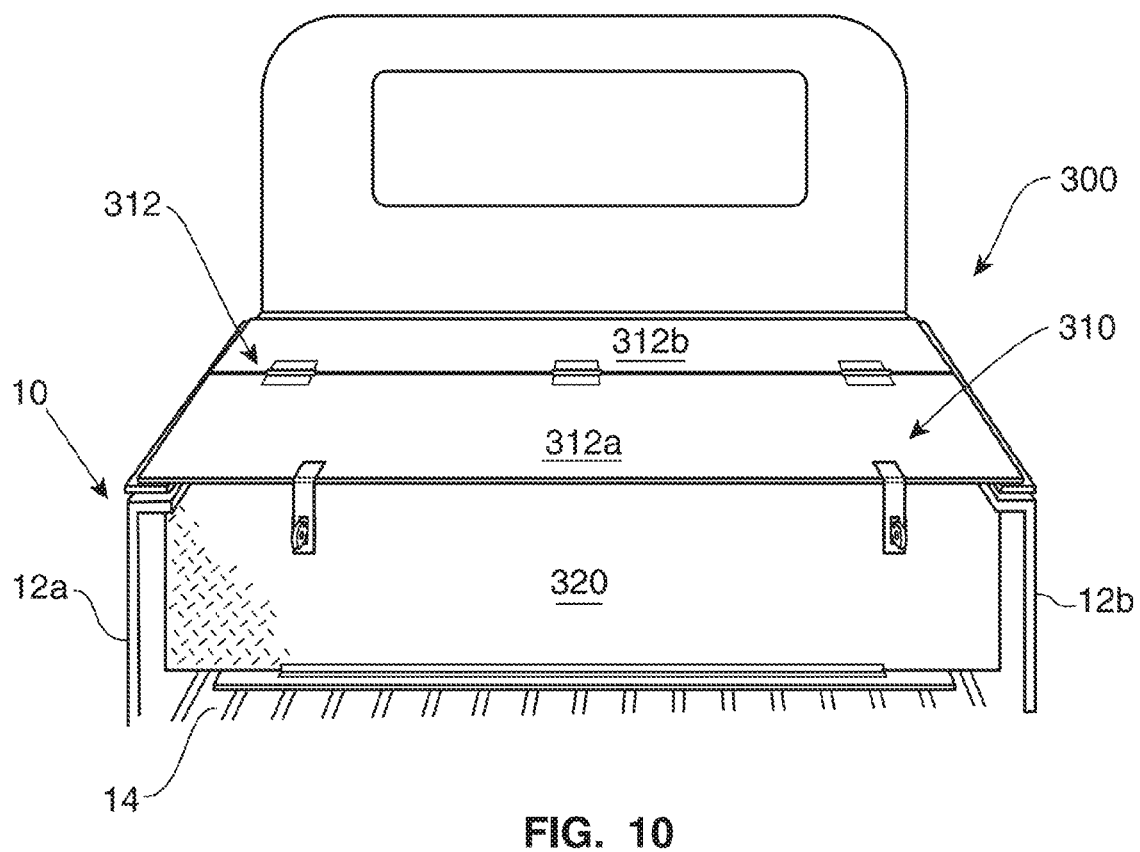
FIG. 10 is a perspective view of another example assembled truck bed storage system, as the lid assembly may be in a closed position.
Figure 11:
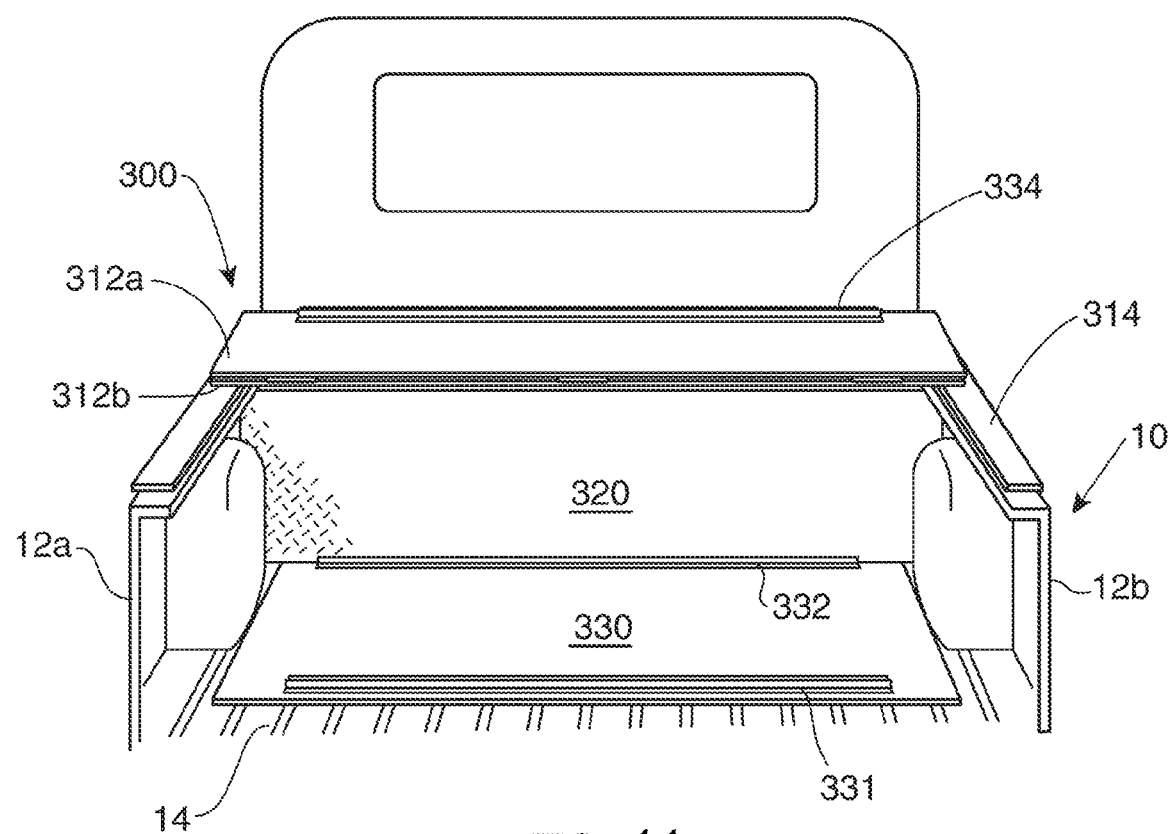
FIG. 11 illustrates the example assembled truck bed storage system shown in FIG. 10, as the lid assembly may be in an open position.

FIG. 10 is a perspective view of another example assembled truck bed storage system 300, as the lid assembly 310 may be in a closed position. FIG. 11 illustrates the example assembled truck bed storage system 300 shown in FIG. 10, as the lid assembly 310 may be in an open position. The example truck bed storage system 300 is shown in FIGS. 10 and 11 as it may be mounted in a truck bed 10 having sidewalls 12a-b and floor 14.

It is noted that although shown including a floor plate 330, in another example the floor plate 330 may be omitted. Instead, the user may use an end plate with pins, such as the end plate 120 illustrated in FIG. 3 having pins 122. In an example, multiple sets of holes may be provided in the truck bed 10 to enable the end plate 320 to be provided in multiple positions in the truck bed 10.

The lid assembly 310 may include top portion 312 and a substantially "square-U" shaped frame 314. The top portion 312 may include two sections, 312a-b, hingedly connected to one another. The top portion 312 may be hinged to the frame 314. In an example, the frame 314 may be connected to the truck bed 10 using clamps or other attachment mechanism. Although not shown in this example, side panels may also be provided, as described above with reference to FIGS. 5 and 6.

The example truck bed storage system 300 includes one or more separate end panel 320, and a floor plate 330. It is noted that providing separate end panels (e.g., two or more), enables the truck bed storage system 300 to have separate compartments formed therein. Alternatively, a single end panel 320 may be positioned in either of the rails (e.g., rails 331 and 332 shown in FIG. 12) to enable different sizes of the truck bed storage system 300.

Figure 12:
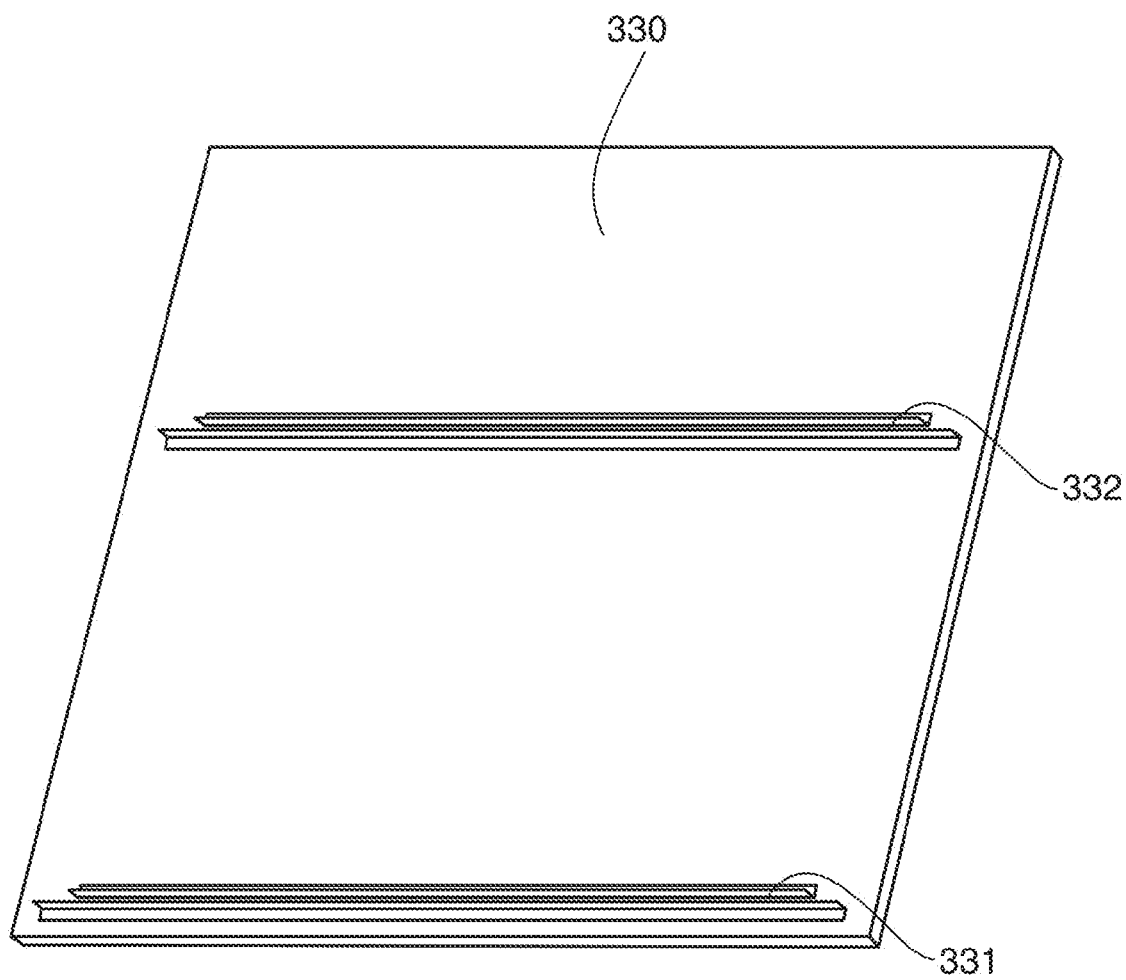
FIG. 12 illustrates a floor plate of the truck bed storage system shown in FIG. 10.

FIG. 12 illustrates a floor plate 330 of the truck bed storage system 300 shown in FIGS. 10 and 11. In this example, the floor plate 330 includes rails 331 and 332 for receiving a lower edge of the end panel(s) 320. In an example, the floor plate 330 may be secured to the floor 14 of the truck bed 10, e.g., by pins, bolts, or other fasteners so that the floor plate 330 remains in a substantially fixed position in the truck bed 10. In another example, the floor plate 330 need not be secured to the floor 14 of the truck bed 10, as securing the frame 314 to the side walls of the truck bed will aid in securing the truck bed storage system 300.

Figure 13:
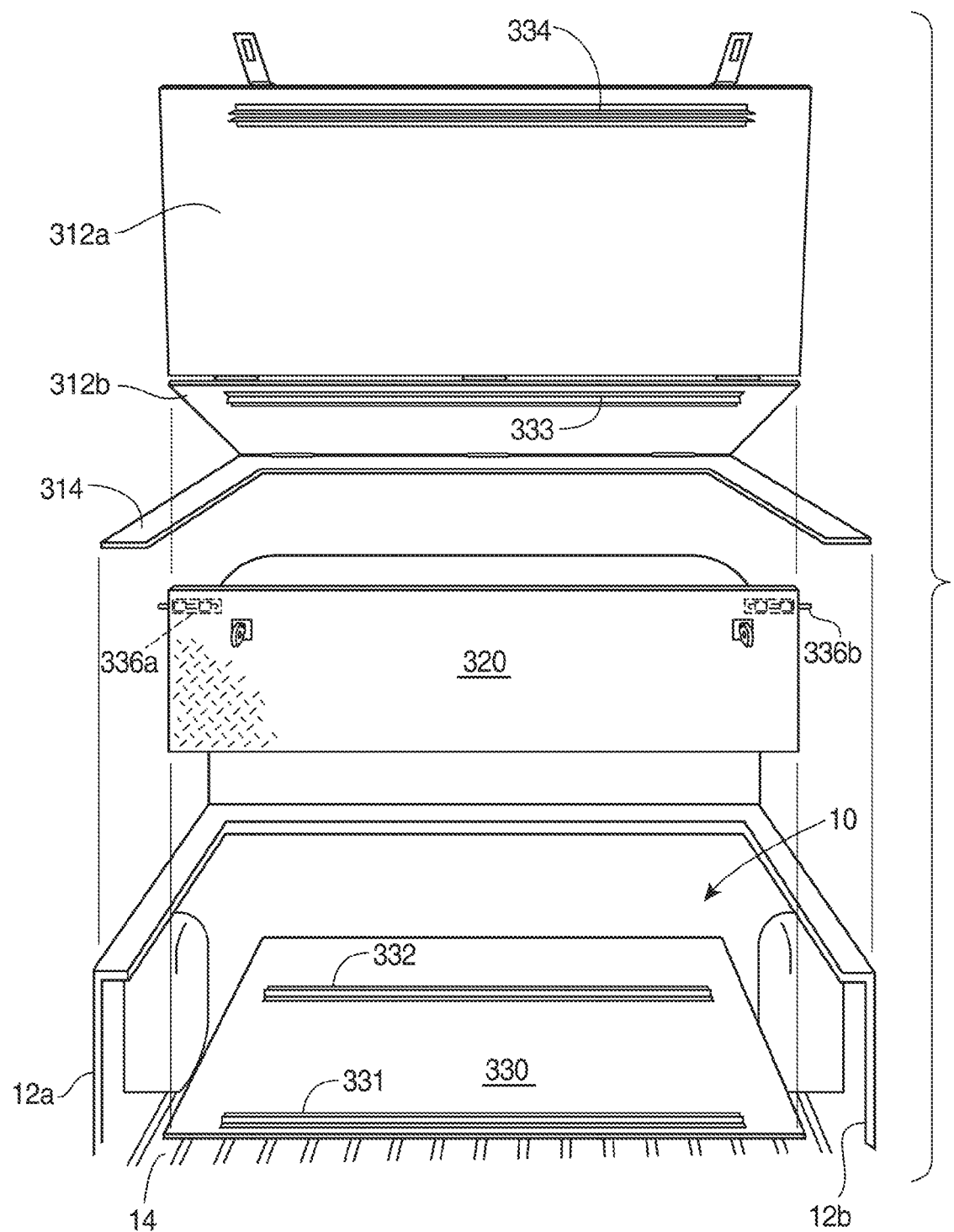
FIG. 13 illustrates installation of the example the truck bed storage system shown in FIG. 10.

FIG. 13 illustrates installation of the example the truck bed storage system 300 shown in FIG. 10, in the truck bed 10. In an example, the floor plate 330 is positioned on the truck bed floor 14. Then the end panel(s) 320 and are slid into the rails 331-332. Top rails 333 and 334 may also be provided in the lid portions 312*a-b* to secure the end panel(s) 320. Additional slide locks or latches 336*a-b* and/or other fasteners may also be provided to secure the end panel 320 to the truck bed.

The frame 314 may then be secured to the side walls 12*a-b* of the truck bed 10. For example, the frame 314 may be secured by bolts, clamps, or other fasteners through holes formed in the frame 314 and aligned with corresponding openings formed in the sidewalls 12*a-b* of the truck bed 10, as already described above with reference to FIG. 2.

To disassemble the storage system, the process for assembly can be reversed. Disassembly may easily be performed by a single person. While unassembled, the system components are capable of lying on top of one another to occupy a space small relative to the space defined by the assembled system. This feature facilitates storage and transport of the system.

Although not shown on truck bed storage system 300, handles may be provided on the end panel and/or on the lid assembly to facilitate the user configuring, installing and removing the truck bed storage system 300 in the truck bed 10. Other accessories may also be provided (e.g., locks, hooks, mounts for a sports rack, etc.). For example, latch 360*a-b* are illustrated in FIG. 13 to secure the end plate in an upright position.

The truck bed storage system 300 is configurable and reconfigurable, e.g., for different purposes. In an example, a smaller box and/or toolbox may be provided by installing the mounting bracket and end plate into the position closest to the cab of the truck. The lid is folded in half and this forms the smaller box. The folded lid can be fastened down for traveling. The lid folds down to cover the entire box. To access the box, the lid folds in half, the two sides of the lid lift and stand upright against the cab of the truck. When both lids are upright, these can be locked or fastened into position. To switch from the smaller box to a larger box, the mounting bracket and end plate move, and the lid unfolds. In an example, transformation time is less than 2 minutes.

The storage system may be provided in any of a variety of sizes according to the size of the storage space desired and the size of the pick-up truck bed into which the system will be assembled.

Any of a variety of articles may be held within an assembled truck-bed storage system, for example, tools and camping equipment.

Figure 14:
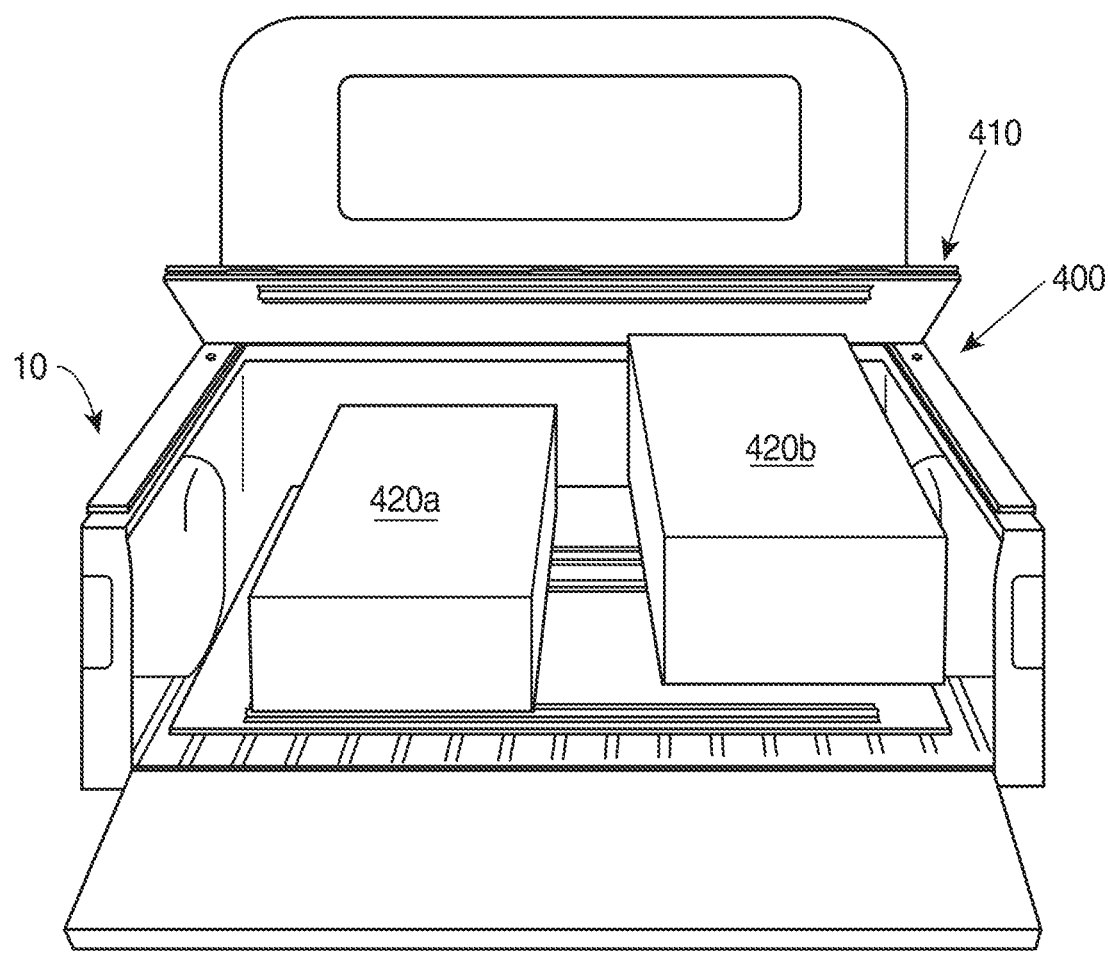
FIG. 14 illustrates the example truck bed storage system as it may be configured to haul an oversize load.

FIG. 14 illustrates an example truck bed storage system 400, as it may be configured to haul an oversize load. In this illustration, the lid assembly 410 has been folded up to enable placement of large boxes 420*a-b* in the truck bed 10. In an example, a larger box and/or cargo box may be provided by removing the intermediate end plate and installing only an end plate into the position furthest from the cab, or removing the end plate altogether for longer loads, as shown in FIG. 14.

Figure 15:
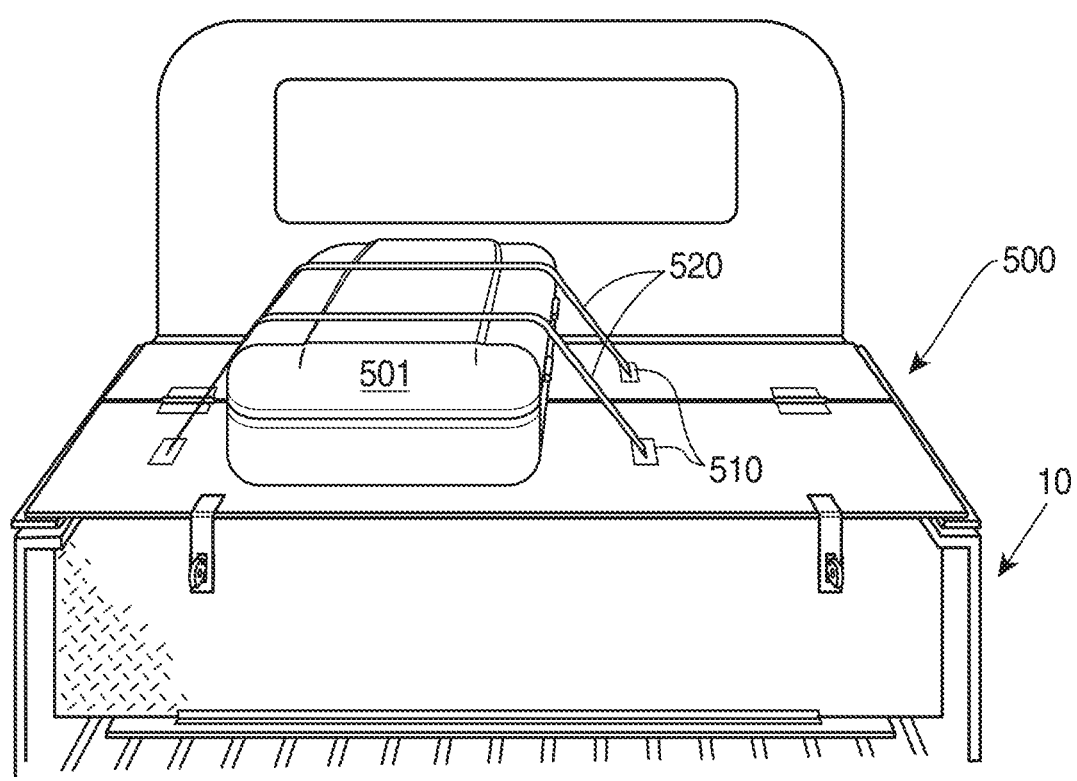
FIG. 15 illustrates the example truck bed storage system as it may be configured to haul a load on top of the lid.

FIG. 15 illustrates an example truck bed storage system 500, as it may be configured to haul a load on top of the lid. In this illustration, anchors 510 are provided on top of the lid assembly to provide an anchor location for connecting straps 520 to secure a suitcase 501.

Still further examples are contemplated. The following example configurations are provided for purposes of illustration, and are not intended to be limiting in any manner.

In an example, a truck owner wishing to store items in a secure manner in a truck bed may decide to use the truck bed storage system (e.g., 100, 200, 300, or variations thereof). The system includes an upright plate, wherein the plate is in the shape of a rectangle, the plate being fitted with at least two pins spaced apart on a long edge of the plate. Further the system includes a rectangular top plate that has a frame and a lid portion which are connected via a hinge or other appropriate means. The top plate frame may have pre-drilled holes, e.g., one in each short side of the rectangular frame portion.

To construct the storage system holes are drilled in the bed of the truck so as to substantially match the placement of the pins of the upright plate. Once the upright place is secured, which may be attained by use of the pins solely or an additional system wherein the top portion of the upright plate is fitted to the truck bed for example with pins that slide from the upright plate into the sides of the truck bed. Next, the lid plate may be affixed to the rails of the bed in a temporary manner.

To affix the lid plate to the truck, holes in the frame are marked on the bed rails, and holes are drilled of the appropriate size. Bolts may be guided through the top plate pre-drilled holes and the holes drilled in the bed railing(s) and secured with a nut. Once the upright plates and top plates are fixed to the truck bed an inner space is formed by the cab wall, two side rails or walls of the truck bed, the upright and lid plates of the storage system. The lid plate may be locked to the upright plate using for instance a padlock.

In another example, the dimension of the inner space may cover about a third of the truck bed (e.g., as is shown in FIG. 1), about two-thirds of the bed (e.g., as shown in FIG. 5), or a lid that has two panels may be employed (e.g., as shown in FIG. 10). It is noted that the example shown in FIG. 10 may include two sections that are substantially the same size, or the two sections may be different sizes. This arrangement enables a user to store items inside the storage system in front of the storage system area but under the lid, and on top of the storage system area for stowage of larger items, e.g., such as for bicycles.

FIGS. 16-21 show another example truck bed storage system 600. In an example, the example truck bed storage system 600 has no mounting frame. Structurally, the lid with stops, hinges, slide locks and header stop embody the majority of the mechanics of the box. In addition, the truck bed storage system 600 may provide one or more compartments in the bed of the truck. In an example, these compartments are referred to as a cargo box and a tool box. For example, the larger compartment is generally referred to as a cargo box, and the smaller compartment is generally referred to as a tool box.

The truck bed storage system 600 may be manufactured of any suitable material, such as but not limited to, metal, plastic, metal or plastic—coated wood, and/or other materials. Although not shown, the example truck bed storage system 600 may be mounted in a truck bed (e.g., truck bed 10 in FIG. 5 having sidewalls 12*a-b* and floor 14).

Figure 16:
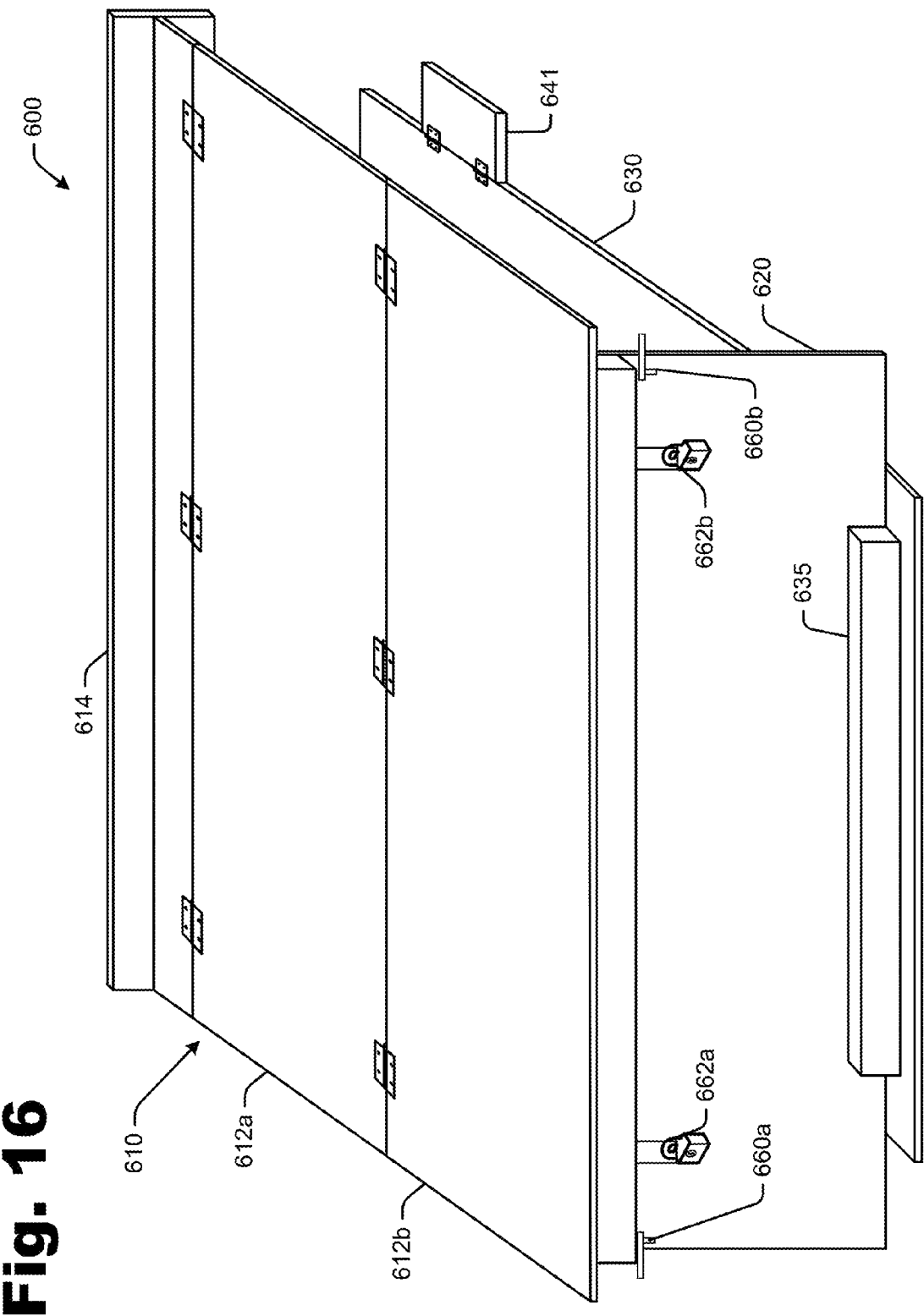
FIGS. 16-21 show another example truck bed storage system.

As shown in FIG. 16, the storage system 600 may include lid assembly 610 with one or more portions (top portions 612*a* and 612*b* are shown) and a header assembly 614. In an example, the header 614 is shown as being substantially T-shaped, however, the header may also be substantially L-shaped. In another example, the header may be substantially U-shaped (e.g., a bracket configured to fit over the front wall of the pickup bed. Still other configurations are contemplated.

Figure 23A:
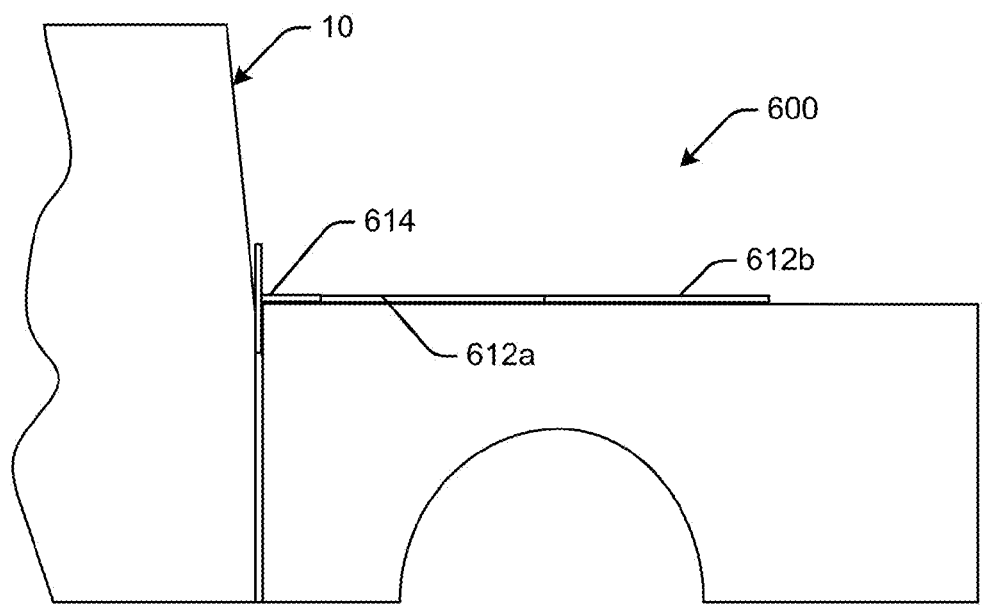
Figure 23B:
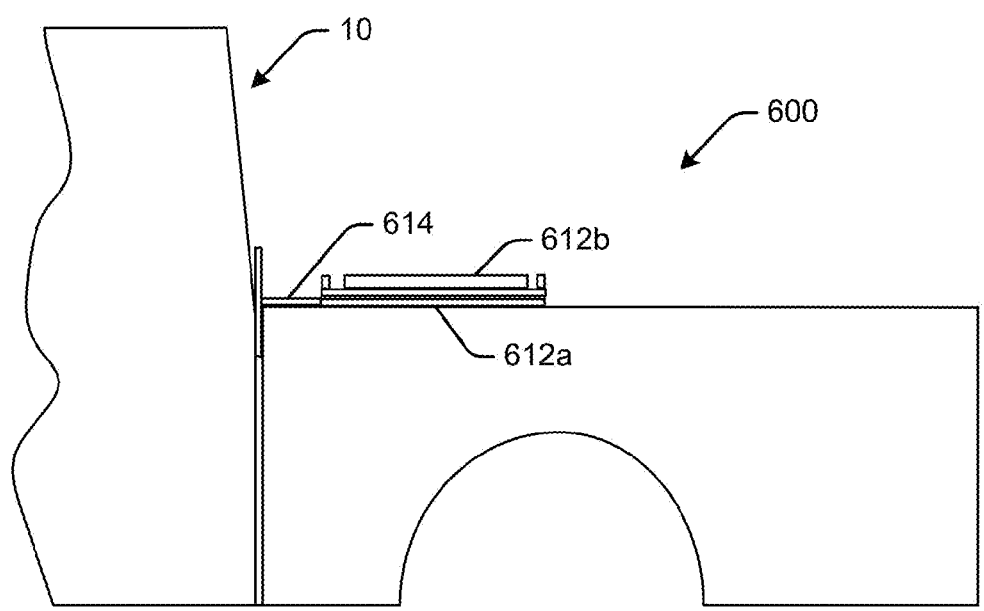

The top portion 612*a* may be hinged to the header assembly 614. The top portion 612*a* and 612*b* may also be hinged together. As such, the storage system 600 is configurable for different size and/or types of loads (e.g., as illustrated in FIGS. 23A-C described below.

The example storage system 600 also includes an end plate 620 and a floor plate 630. The end panel 620 may be provided on the floor plate 630, e.g., by way of slotted retainer 635. The end panel 620 may be removable. The end panel 620 may be attached at a bottom edge of the end plate 620 to the slotted retainer 635.

It is noted that although shown including a floor plate 630, in another example the floor plate 630 may be omitted. Instead, the user may use an end plate with pins, as already described above. For example, multiple sets of holes may be provided in the truck bed 10 to enable the end plate 620 to be provided in multiple positions in the truck bed 10.

Although not shown in this example, side panels may also be provided, as described above with reference to FIGS. 5 and 6.

In an example, the storage system 600 may include lockable latches 662*a* and 662*b* (e.g., similar to 262*a* and 262*b* shown in FIG. 5).

Figure 17:
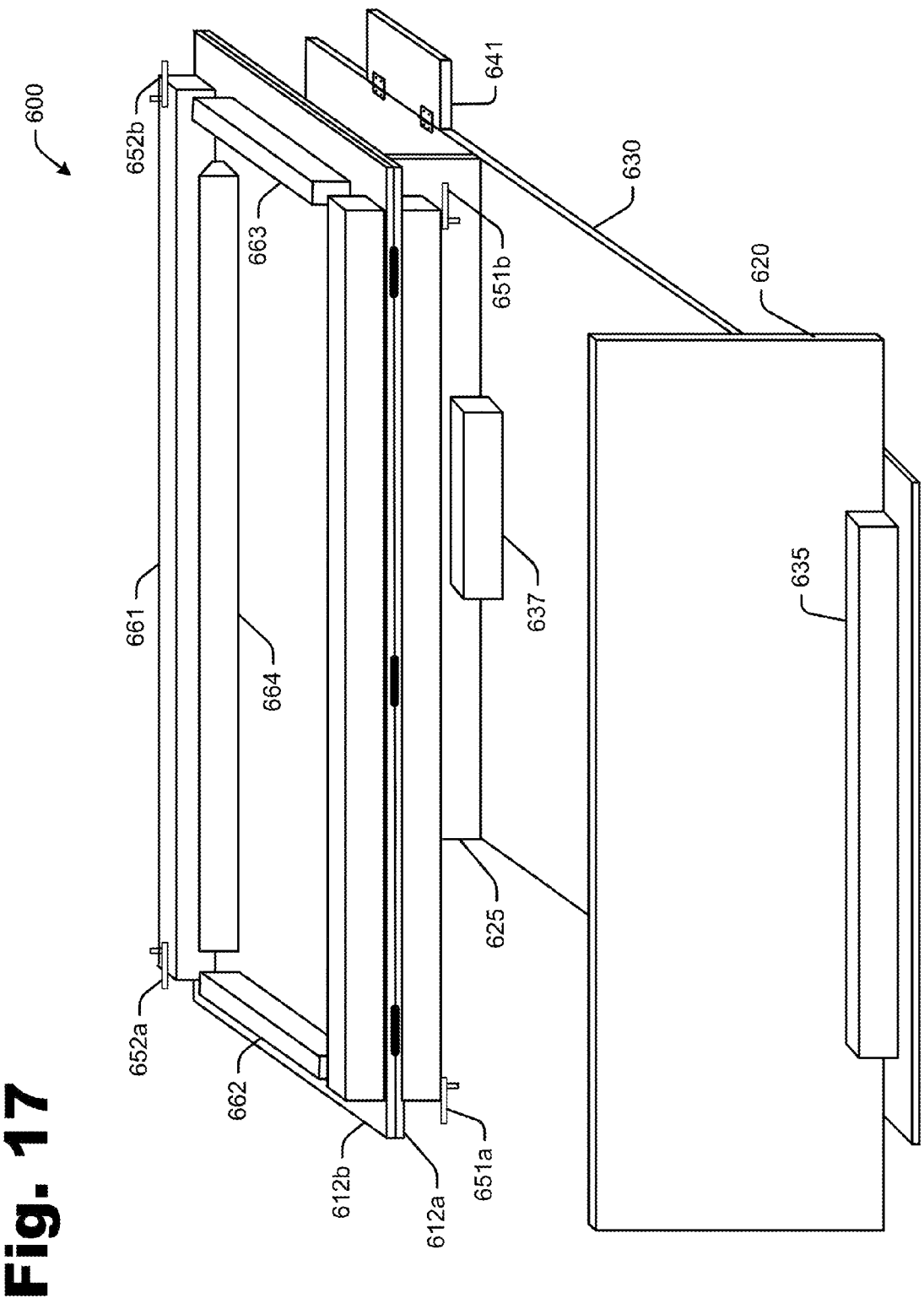
Figure 18:
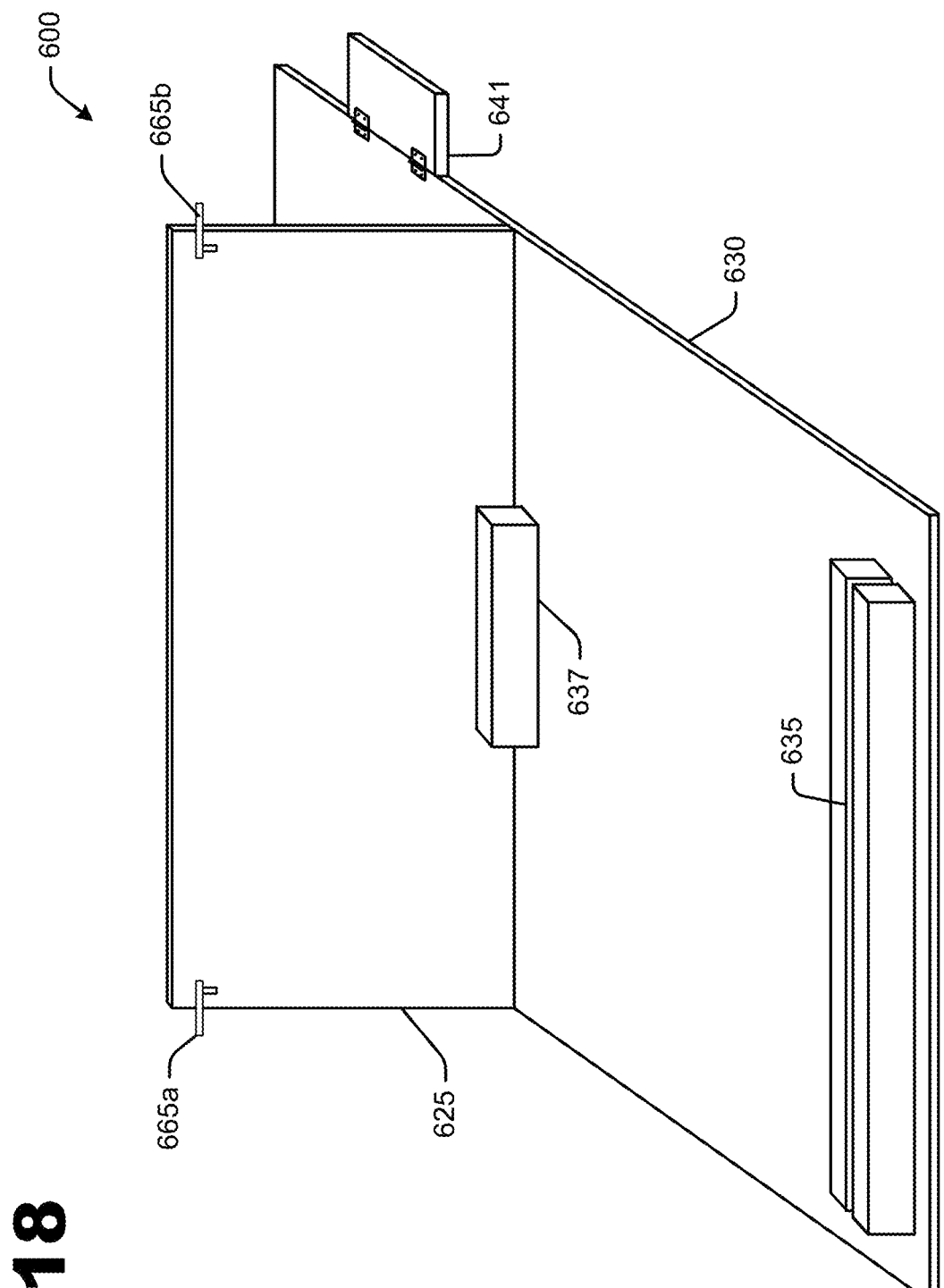
Figure 19:
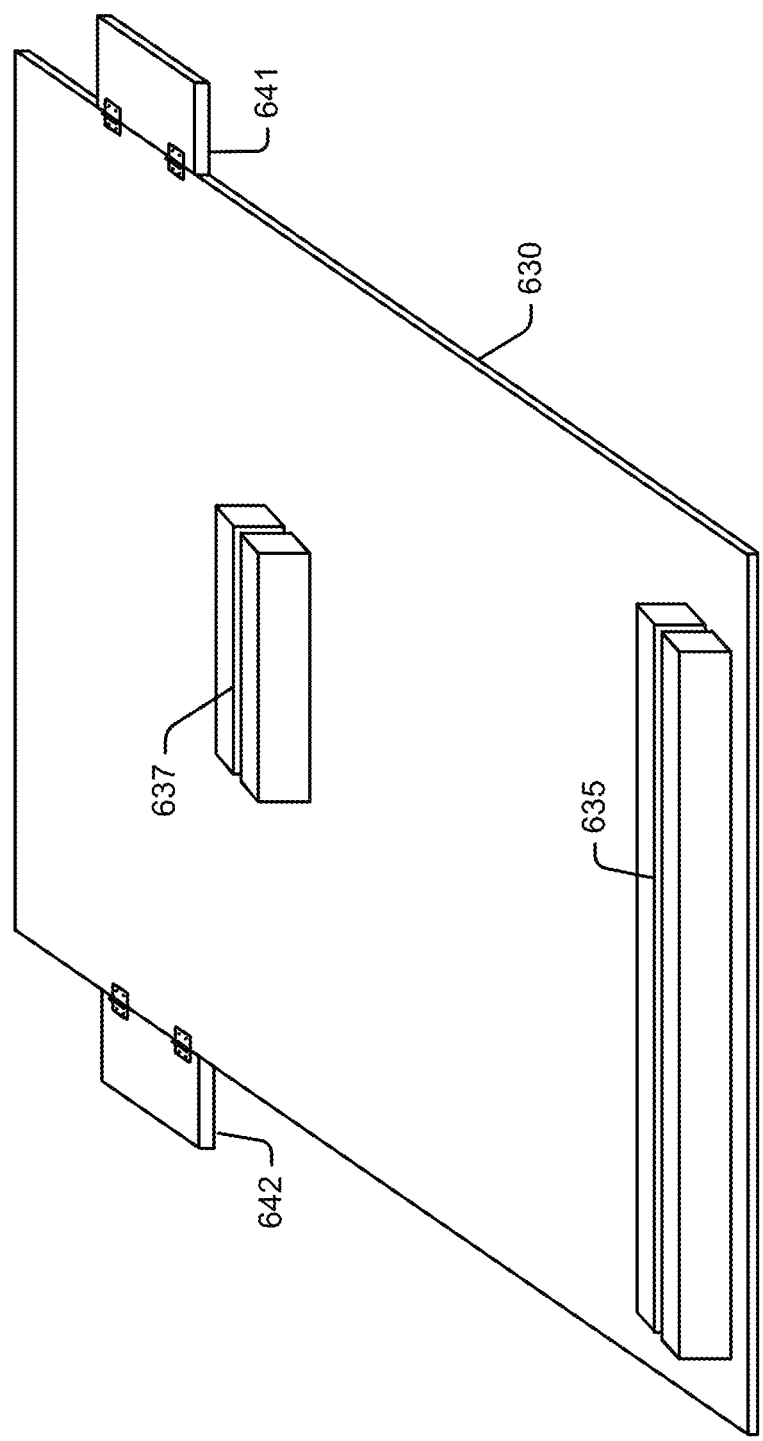

FIG. 17 is a perspective view of the example assembled truck bed storage system 600, as the lid assembly 610 may be partially opened. That is, top portion 612*b* is shown folded onto top portion 612*a*. FIG. 18 is a perspective view of the example assembled truck bed storage system 600, as the lid assembly 610 may be removed. FIG. 19 is a perspective view of the example assembled truck bed storage system 600 wherein the panel 625 is removed.

The example truck bed storage system 600 may also include another panel 625 visible in FIGS. 17 and 18. The panel 625 may be provided on the floor plate 630, e.g., by way of slotted retainer 637. The panel 625 may be attached at a bottom edge of the panel 625 to the slotted retainer 637. In an example, the panel 625 may be removable, and may even be interchangeable with the end panel 620.

It is noted that the panels 620 and 625 enable the truck bed storage system 600 to have separate compartments formed therein. In an example, the panel 625 is positioned closer to the truck cab to provide a tool storage area. However, the panel(s) (panels 620 and 625 or other panels, not shown) may be arranged in any desired configuration. In another example, even a single end panel 620 may provide different size compartments in the truck bed storage system 600 (e.g., by positioning the panel at different locations on the floor plate 630 or in the truck bed.

In an example, the floor plate 630 may be secured to the floor of the truck bed, e.g., by pins, bolts, or other fasteners so that the floor plate 630 remains in a substantially fixed position in the truck bed. In another example, the floor plate 630 need not be secured to the floor of the truck bed.

In an example, the floor plate 630 may fold (e.g., into halves, thirds, or otherwise) via hinges. A foldable floor plate 630 enables easier insertion and removal in the truck bed, easier shipping, and/or for storage.

In an example, the floor plate 630 may include floor plate wings (wing 641 is visible in FIGS. 16-18, and both wings 641 and 642 are visible in FIG. 19). The floor plate wings 641 and 642 may fold up to enable the floor plate 630 to readily slide into the truck bed. Floor plate wings 641 and 642 may then fold down behind the wheel wells, e.g., to assist in retaining the floor plate in position so as not to slide out of the truck bed.

Figure 20:
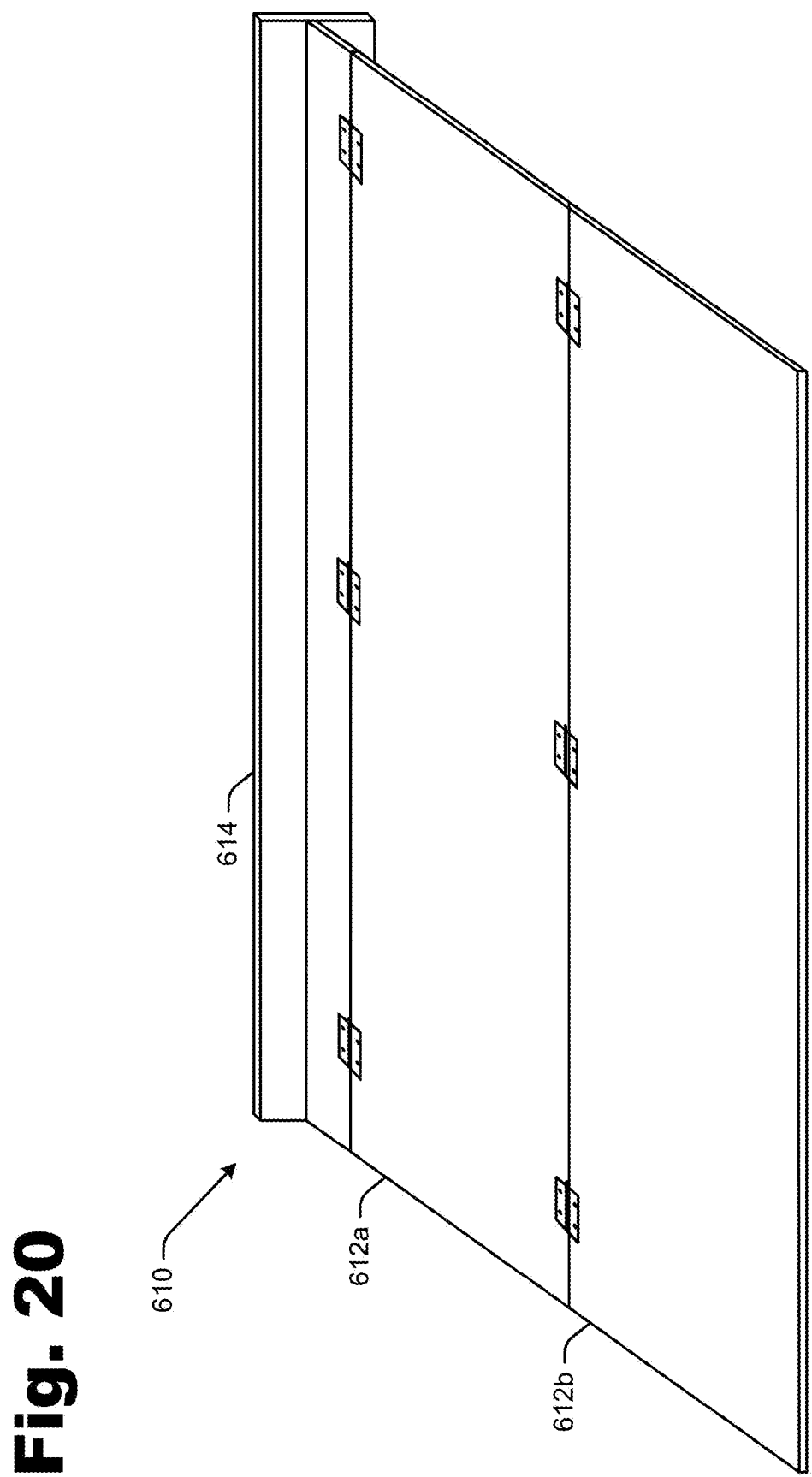
Figure 21:
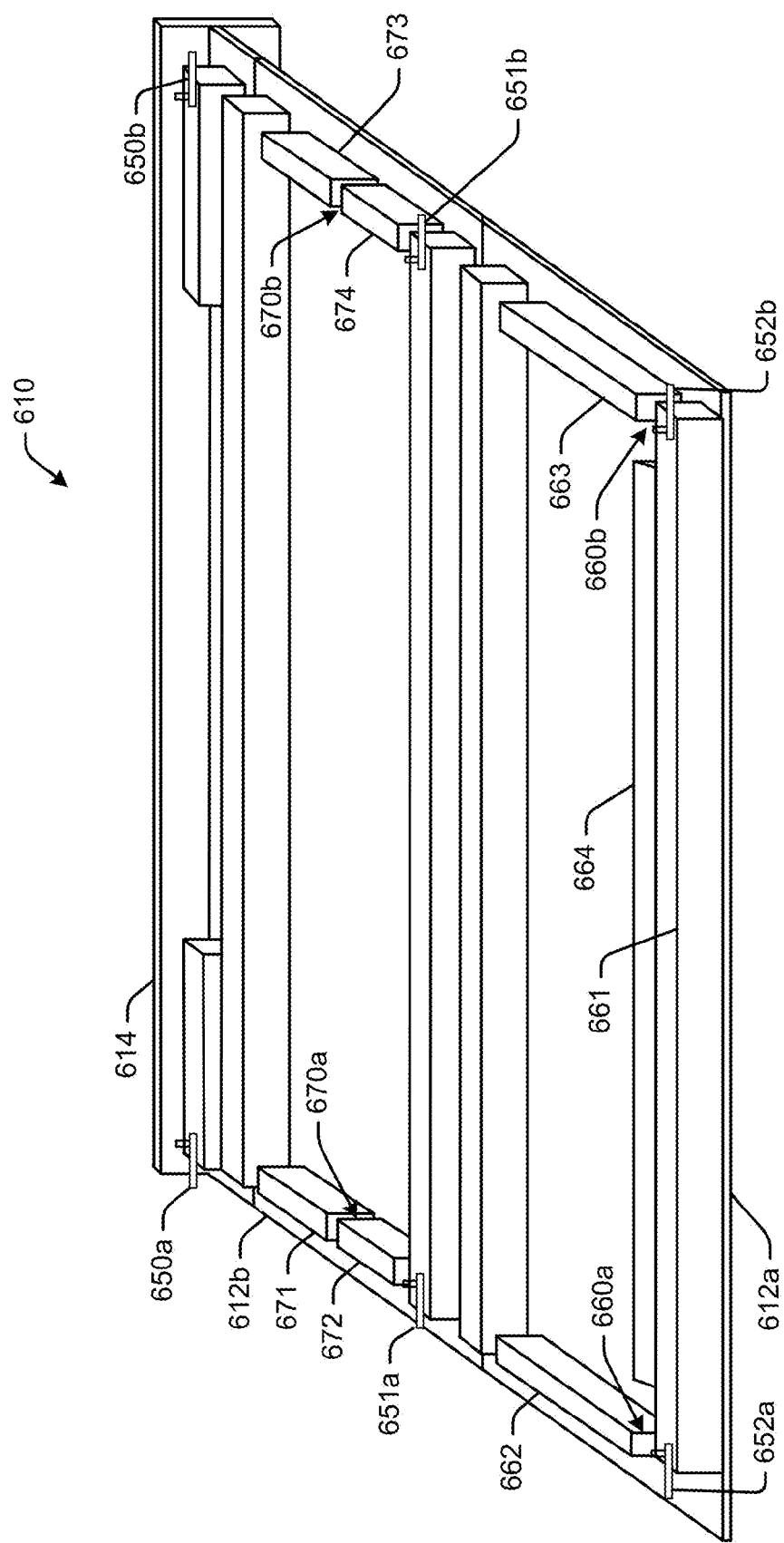

FIG. 20 is a top perspective view of the lid assembly 610 and header assembly 614. FIG. 21 is a bottom perspective view of the lid assembly 610 and header assembly 614. The lid and floor plate may have 2 sets of upper and lower corresponding channels that hold the end plate into the desired configuration.

In an example, the header assembly 614 may include latches 650*a-b*. The header assembly 614 may be secured to the truck bed by extending latches 650*a-b* under an inner lip or ledge of the sidewall in the truck bed. Likewise, top portions 612*a* and 612*b* of the lid assembly 610 may also include latches 651*a-b* and 652*a-b*.

The latches or slide locks may be mounted to the lid. Spacers may be provided to ensure the slide lock is in the desired position for a snug fit. For example, if the bed rails and various building materials are not an exact thickness or level surface, the spacers help compensate for the difference.

In an example, the latches may be extended under the inner lip of the sidewall in the truck bed to secure the lid portions 612*a* and/or 612*b* to the truck bed. In an example, the latches 650*a-b* may secure the header assembly 614 and lid assembly 610 to the truck bed without having to drill holes into the truck bed. As such, the storage system interlocks within itself and the truck bed without the drilling of holes or the use of tools.

Lid assembly 610 may also include one or more channels formed therein to secure the panels 620 and 625 in any of several configurable locations. For example, lid assembly 610 is shown in FIG. 21 including channels 660*a* and 660*b* formed between blocks 661, 662, and 663 to retain the end panel 620 in a substantially upright position. Another block 664 may provide further support for the end panel 620. In an example, the block 664 may be angled thereby forming a beveled channel between block 661 and block 664. The beveled channel may better enable the lid to open and close onto the edge of the end panel 620.

Channels 670*a* and 670*b* are also shown in FIG. 21 formed between blocks 671-672 and 673-674 to retain the panel 625 in a substantially upright position. Other channels may also be provided (e.g., those shown and others not shown in FIG. 21) in lid assembly 610.

Figure 22:
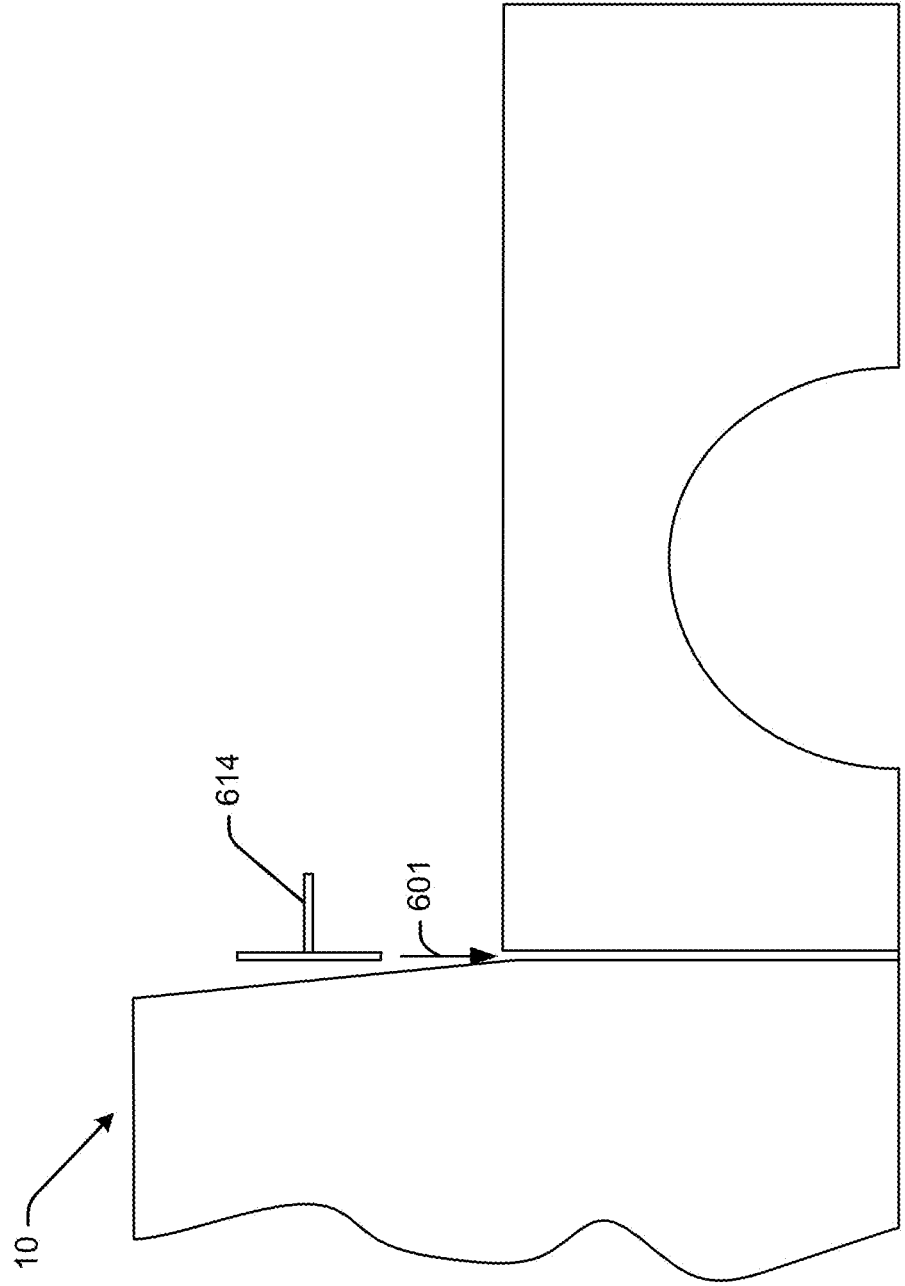
FIG. 22 illustrates installation of the example truck bed storage system 600 shown in FIGS. 16-21.

FIG. 22 illustrates installation of the example truck bed storage system 600 shown in FIGS. 16-21. FIG. 22 illustrates installation of the example the truck bed storage system 600 shown in FIG. 16, in a truck bed 10. In an example, the floor plate 630 is positioned on the truck bed floor. Then the panel(s) 620, 625 are slid into place. The panels 620 and/or 625 may then be inserted into the channels formed in the floor plate 630. In an example, latches 660a-b on the end panel 620 and latches 665a-b on panel 625 may be slid into corresponding openings or holes formed in the truck bed to support the panels in a substantially upright position even when the lid assembly 610 is removed or in an open position.

The header assembly 614 may then be secured behind the cab of the truck. For example, the header assembly 614 may be aligned with an opening typically formed between the cab and bed of the truck, and slid down into place, as illustrated by arrow 601. The lid assembly 610 can then be connected to the header assembly 614. In another example, the lid assembly 610 may be connected to the header assembly 614 before connecting to the truck bed.

In an example, the header assembly 614 may be secured to the truck bed. For example, by extending latches 650a-b under an inner lip or ledge of the sidewall in the truck bed. Top portions 612a and 612b may likewise be secured under the inner lip of the sidewall in the truck bed, e.g., by extending latches 651a-b and 652a-b. In an example, the latches may secure the header assembly 614 and lid assembly 610 to the truck bed without having to drill holes into the truck bed.

To disassemble the storage system, the process for assembly can be reversed. Disassembly may easily be performed by a single person. While unassembled, the system components are capable of lying on top of one another to occupy a space small relative to the space defined by the assembled system. This feature facilitates storage and transport of the system.

Although not shown on truck bed storage system 600, handles may be provided on the end panel and/or on the lid assembly to facilitate the user configuring, installing and removing the truck bed storage system 600 in the truck bed. Other accessories may also be provided (e.g., locks, hooks, mounts for a sports rack, etc.).

FIGS. 23A-C illustrate operation of the example truck bed storage system shown in FIGS. 16-21. The truck bed storage system 600 is configurable and reconfigurable, e.g., for different purposes. In an example, a smaller box and/or toolbox may be provided by installing the mounting bracket and end panel into the position closest to the cab of the truck. The lid is folded in half and this forms the smaller box. The folded lid can be fastened down for traveling. The lid folds down to cover the entire box. To access the box, the lid folds in half, the two sides of the lid lift and stand upright against the cab of the truck. When both lids are upright, these can be locked or fastened into position. To switch from the smaller box to a larger box, the mounting bracket and end plate move, and the lid unfolds. In an example, transformation time is less than 2 minutes.

The example truck bed storage system 600 may be configured to haul an oversize load. For example, the lid assembly 610 may be folded up to enable placement of large boxes in the truck bed. In an example, a larger box and/or cargo box may be provided by removing one of the panels, and installing only an end panel into the position furthest from the cab, or removing the end panel altogether for longer loads.

The storage system may be provided in any of a variety of sizes according to the size of the storage space desired and the size of the pick-up truck bed into which the system will be assembled. Any of a variety of articles may be held within an assembled truck-bed storage system, for example, tools and camping equipment.

It is noted that the examples shown and described are provided for purposes of illustration and are not intended to be limiting. Still other examples are also contemplated.

The invention claimed is:

1. A modular truck bed storage system, comprising:
a removable end panel;
a header assembly configured to insert between a truck cab and a truck bed;
a lid assembly having a top portion connected to a frame to operate between an open position and a closed position;
a plurality of latches to secure the header assembly and the lid assembly under an inner edge of the truck bed; and
a floor plate with wings, the wings retracting to enable the floor plate to slide into the truck bed, and the wings extending to secure the floor plate behind wheel wells of the truck bed.

2. The system of claim 1, further comprising a channel slot formed in the lid assembly to retain the removable end panel in a substantially upright position.

3. The system of claim 1, wherein the floor plate includes at least one channel for receiving the removable end panel.

4. The system of claim 1, further comprising a divider panel.

5. The system of claim 4, further comprising a channel slot formed in the lid assembly to retain the divider panel in a substantially upright position.

6. The system of claim 1, wherein the lid assembly includes at least two sections, one of the two sections foldable over another of the two sections to partially open a compartment formed in the truck bed under the lid assembly.

7. A method for providing a modular storage compartment in a truck bed, comprising:
providing a removable end panel;
providing a header assembly configured to insert between a truck cab and the truck bed;
providing a lid assembly for connecting to the header assembly, the top portion configurable between an open position and a closed position;
providing a plurality of latches to secure the header assembly and the lid assembly under an inner edge of the truck bed; and
providing a floor plate having wings, wherein the wings retract to enable the floor plate to slide into the truck bed.

8. The method of claim 7, wherein the floor plate includes at least one channel for receiving the removable end panel.

9. The method of claim 7, wherein the wings extend to secure the floor plate behind wheel wells of the truck bed.

10. The method of claim 7, wherein the lid assembly includes at least two sections.

11. The method of claim 10, wherein one of the two sections is foldable over another of the two sections to partially open a compartment formed in the truck bed under the lid assembly.

12. A system for providing a storage compartment in a truck bed, comprising:
means for forming a compartment in the truck bed with at least one removable panel; and
means for covering and uncovering the compartment;
means for securing the means for covering and uncovering the compartment between a truck cab and the truck bed;
means for latching the means for securing and the lid assembly under an inner edge of the truck bed; and
a floor plate with means for extending a portion of the floor plate behind wheel wells of the truck bed.

13. The system of claim 12, further comprising means for retaining the at least one removable end panel in a substantially upright position.

14. The system of claim 12, further comprising a floor plate with means for retracting a portion of the floor plate to enable the floor plate to slide into the truck bed.

15. The system of claim 12, wherein the floor plate includes means for receiving the at least one removable panel.

\* \* \* \* \*